(12) United States Patent
Vagni

(10) Patent No.: US 11,370,270 B2
(45) Date of Patent: Jun. 28, 2022

(54) AIR-GUIDING ELEMENT AND MOTOR VEHICLE

(71) Applicant: FORD GLOBAL TECHNOLOGIES, LLC, Dearborn, MI (US)

(72) Inventor: Alejandro Cristian Vagni, Frankfurt (DE)

(73) Assignee: Ford Global Technologies, LLC, Dearborn, MI (US)

( * ) Notice: Subject to any disclaimer, the term of this patent is extended or adjusted under 35 U.S.C. 154(b) by 410 days.

(21) Appl. No.: 16/238,307

(22) Filed: Jan. 2, 2019

(65) Prior Publication Data

US 2019/0202263 A1 Jul. 4, 2019

(30) Foreign Application Priority Data

Jan. 2, 2018 (DE) .......................... 102018200007.7

(51) Int. Cl.
*B60H 1/24* (2006.01)
*B60S 1/54* (2006.01)
*B60J 1/20* (2006.01)

(52) U.S. Cl.
CPC ............ *B60H 1/242* (2013.01); *B60J 1/2002* (2013.01); *B60S 1/54* (2013.01)

(58) Field of Classification Search
CPC ...... B60H 1/242; B60H 1/244; B60H 1/3457; B60S 1/54; B60S 1/586; B60J 1/2002; B60J 1/2008
USPC ........................................................ 454/127
See application file for complete search history.

(56) References Cited

U.S. PATENT DOCUMENTS

| 2,096,901 | A | | 4/1937 | Knecht | |
|---|---|---|---|---|---|
| 3,395,388 | A | * | 7/1968 | Hendrickson | B60Q 1/441 340/464 |
| 3,741,285 | A | * | 6/1973 | Kuethe | F28F 13/12 165/181 |
| 4,109,562 | A | | 8/1978 | MacDonald | |
| 5,126,926 | A | * | 6/1992 | Chiang Wen | B60Q 7/00 340/472 |
| 5,150,098 | A | * | 9/1992 | Rakow | B60Q 1/444 340/464 |
| 5,255,165 | A | * | 10/1993 | Cail | B60Q 1/442 362/249.01 |

(Continued)

FOREIGN PATENT DOCUMENTS

| CA | 1102373 A | 6/1981 |
|---|---|---|
| DE | 930724 C | 7/1955 |

(Continued)

OTHER PUBLICATIONS

English Machine Translation of EP268107B1 dated Jun. 17, 2015.

(Continued)

*Primary Examiner* — Avinash A Savani
*Assistant Examiner* — Dana K Tighe
(74) *Attorney, Agent, or Firm* — Vichit Chea; Price Heneveld LLP

(57) ABSTRACT

An air-guiding element for arrangement in an interior compartment, which is at least partially enclosed by windows, of a motor vehicle is provided. The air-guiding element is designed to generate a turbulent flow downstream of the air-guiding element when an air flow impinges on the air-guiding element. A motor vehicle having said air-guiding element is also described.

18 Claims, 4 Drawing Sheets

(56) References Cited

U.S. PATENT DOCUMENTS

| | | | |
|---|---|---|---|
| RE35,686 E * | 12/1997 | Robinson | B60Q 1/302 |
| | | | 307/10.8 |
| 6,089,971 A | 7/2000 | Jokela et al. | |
| 6,394,890 B1 | 5/2002 | Merkel | |
| 6,427,760 B2 * | 8/2002 | Klinger | B60H 1/00064 |
| | | | 165/42 |
| 8,192,063 B2 * | 6/2012 | Neufeglise | B60Q 1/52 |
| | | | 362/541 |
| 9,676,427 B2 * | 6/2017 | Zha | B60R 1/06 |
| 2007/0120757 A1 * | 5/2007 | Ogino | H01Q 7/00 |
| | | | 343/713 |
| 2015/0010407 A1 | 1/2015 | Zamora Rodriguez et al. | |
| 2016/0229540 A1 | 8/2016 | Loukisa | |

FOREIGN PATENT DOCUMENTS

| | | |
|---|---|---|
| DE | 1218297 B | 6/1966 |
| DE | 1680288 B2 | 2/1976 |
| DE | 19755593 A1 | 6/1999 |
| DE | 602004001725 T2 | 8/2007 |
| EP | 2681079 B1 | 6/2015 |
| JP | 2017065426 A | 4/2017 |

OTHER PUBLICATIONS

English Machine Translation of JP2017065426A dated Apr. 6, 2017.
English Machine Translation of DE930724C dated Jul. 21, 1955.
English Machine Translation of DE602004001725T2 dated Aug. 2, 2007.
English Machine Translation of DE19755593A1 dated Jun. 7, 1999.
English Machine Translation of DE1680288B2 dated Feb. 26, 1976.
Search Report dated Dec. 19, 2018 for DE Application No. 102018200007.7 filed Jan. 2, 2018.
Search Report dated Dec. 19, 2018 for DE Application No. 102018200006.9 filed Jan. 2, 2018.
English Machine Translation of FR2972156A21 dated Sep. 7, 2012.
English Machine Translation of DE1218297B dated Jun. 2, 1966.

* cited by examiner

AIR-GUIDING ELEMENT AND MOTOR VEHICLE

TECHNICAL FIELD

This document relates to an air-guiding element for arrangement in an interior compartment, which is at least partially enclosed by windows, of a motor vehicle as well as to a motor vehicle having said air-guiding element.

BACKGROUND

U.S. Pat. No. 6,394,890 B1 has disclosed a deicing deflector which is formed from an elongate flexible channel which is arranged on the inner side of a windshield close to an upper edge. The channel is an inverted U-shaped profile with an outer, an upper and an inner wall. The outer wall comprises an adhesive surface with a peelable cover which is peeled off immediately before application to the windshield. The channel is composed of a flexible material, such as in particular neoprene, polyurethane or rubber, which can be bent and pulled and, in the process, maintains its U shape.

SUMMARY

It is an object to provide an air-guiding element for the improved aeration of the rear window.

Said object is achieved by means of an air-guiding element and by means of a motor vehicle as set forth in the following claims.

The air-guiding element is designed for arrangement in an interior compartment, which is at least partially enclosed by windows, of a motor vehicle. The air-guiding element is furthermore designed to, when an air flow impinges on the air-guiding element, generate a turbulent flow downstream of the air-guiding element.

Thus, a device is provided which can be integrated into a motor vehicle and which assists in more quickly demisting a window to which the air-guiding element is assigned.

In one advantageous embodiment of the air-guiding element, the latter comprises an incident-flow region for receiving the air flow and a flow-off region for releasing the turbulent flow. The flow-off region is in particular of concave form. Particularly effective generation of the turbulent flow is thus made possible.

In a further advantageous embodiment of the air-guiding element, the air-guiding element is at least partially transparent, in particular translucent. Thus, a view through said air-guiding element is ensured, and the field of view is not restricted. In the transparent or translucent design, the air-guiding element may under some circumstances be designed to be larger, and thus more effective, without obstructing the view.

In a further advantageous embodiment of the air-guiding element, the latter has a contact surface which is designed for attachment to the window and which is in particular equipped with an adhesive layer. Thus, the air-guiding element is well adapted to the rear window, and can be easily installed.

In a further advantageous embodiment of the air-guiding element, the latter has a lamp. The lamp is in particular formed as a brake lamp. Thus, the air-guiding element is provided with a further function, whereby an additional lamp can be omitted. Furthermore, in this way, greater design freedom is provided for the design and arrangement of the air-guiding element.

The motor vehicle, having an interior compartment which is at least partially enclosed by windows, comprises at least one air-guiding element, assigned to a rear window, in one of the design variants described above.

By means of the air-guiding element, the rear window can be more quickly demisted, and thus the view through the window can be improved. The faster demisting or thawing of the window offers an increase in safety and comfort for the passengers.

The rear window in particular remains misted up for longest in conventional motor vehicles. The benefit of the air-guiding element is thus at its greatest at the rear window.

In a further advantageous embodiment of the motor vehicle, the air-guiding element is arranged on a surface of the rear window, facing toward the interior compartment. This arrangement is advantageous in particular for a retrofit solution, because the air-guiding element can be easily attached to the window.

In a further advantageous embodiment of the motor vehicle, the air-guiding element does not make contact with the window. Thus, the air-guiding element can be arranged in the interior compartment in an unobtrusive and aesthetically more appealing manner than in the case of an adhesively bonded variant.

In a further advantageous embodiment of the motor vehicle, the rear window has a heating wire. The effect of the air-guiding element is thus further assisted.

In a further advantageous embodiment of the motor vehicle, this comprises at least one air vent which is arranged in the interior compartment and which is designed to generate an air flow in the direction of the at least one air-guiding element. The impingement of flow on the air-guiding element can thus be effected in a more targeted manner.

In a further advantageous embodiment, the motor vehicle is a sedan. The rear window of sedans in particular is affected by the misting problem. The arrangement of at least one air-guiding element can solve this problem.

BRIEF DESCRIPTION OF THE DRAWING FIGURES

Further advantages of the new and improved air-guiding element and motor vehicle will emerge from the more detailed description and from the figures.

DETAILED DESCRIPTION

Figure 1:
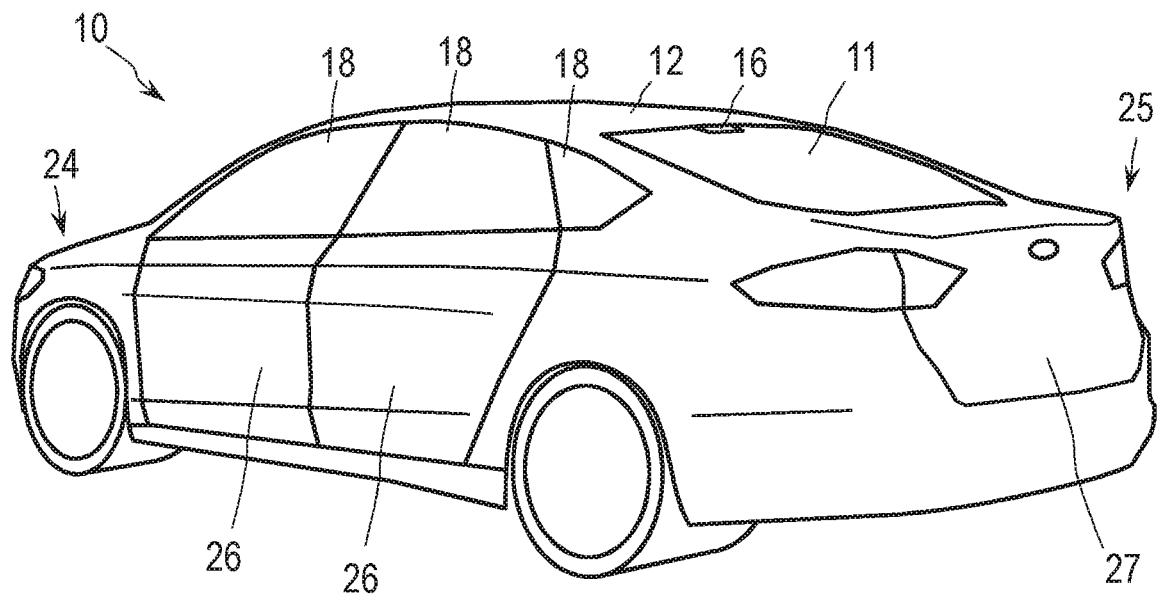
FIG. 1 shows a new and improved motor vehicle in an exemplary embodiment.
Figure 2:
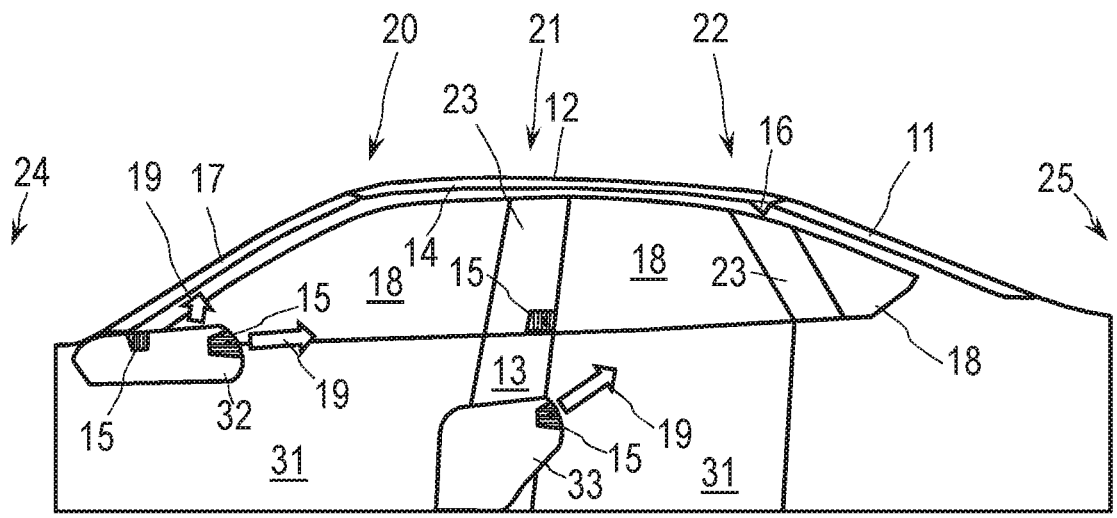
FIG. 2 shows an interior compartment of the motor vehicle in an exemplary embodiment.

FIGS. 1 to 2 illustrate the new and improved motor vehicle 10 in an exemplary embodiment in different views. FIG. 1 shows the exemplary motor vehicle 10 from the outside in a view from the rear quarter, and FIG. 2 shows the exemplary motor vehicle 10 in a sectional illustration. The motor vehicle 10 is in particular in the form of a sedan (notchback). This situation is illustrated in FIGS. 1 and 2. The motor vehicle 10 may alternatively be in the form of a station wagon, fastback, hatchback or squareback. In the exemplary embodiment, the motor vehicle 10 has at least one side door 26 and a tailgate 27.

As is conventional, the motor vehicle 10 has a front 24 and a rear 25. During forward travel, the motor vehicle 10 moves in the direction of the front 24.

As is likewise conventional, the motor vehicle 10 has an interior compartment 13 for accommodating at least one passenger, who may also be a driver of the motor vehicle 10. The interior compartment 13 is schematically shown in an exemplary embodiment in a sectional illustration in FIG. 2.

The interior compartment 13 is at least partially surrounded by windows 11, 17, 18. Accordingly, the motor vehicle 10 has a windshield 17, at least one side window 18 and a rear window 11. The at least one side window 18 is for example arranged in the at least one door 26. The rear window 11 may be arranged in the tailgate 27 or outside the tailgate 27.

The motor vehicle 10 furthermore has a roof 12, which may also be of tiltable and/or foldable design.

The motor vehicle 10 has at least one A pillar 20, and the motor vehicle 10 may furthermore have a B pillar 21 and/or a C pillar 22. In the exemplary embodiment as a sedan, the motor vehicle 10 consequently has the A pillar 20, the B pillar 21 and the C pillar 22, wherein a side window 18 is arranged in the C pillar 22.

Figure 7:
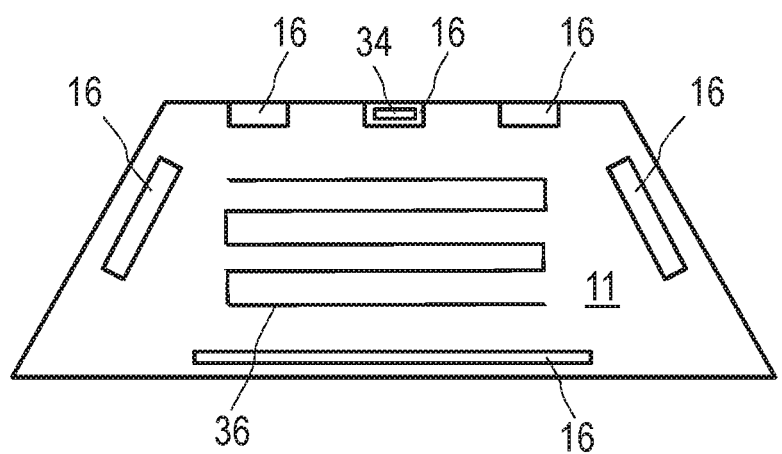
FIG. 7 shows the air-guiding element in a further exemplary arrangement.

The motor vehicle 10 comprises at least one air-guiding element 16, which is assigned to the rear window 11. It is also possible for multiple air-guiding elements 16, which are arranged in particular in a pattern, in particular in a row, to be assigned to the rear window 11. This situation is shown in FIG. 7. In said figure, multiple air-guiding elements 16 are arranged in a row in an upper region of the rear window 11. It is additionally possible for at least one further air-guiding element 16 to be arranged at the lateral regions of the rear window 11 and/or in the lower region of the rear window 11.

The rear window 11 furthermore may have a heating wire 36 (see FIG. 7). The air-guiding element 16 is schematically illustrated in exemplary embodiments, in each case in a functional sketch, in FIGS. 3, 4 and 5.

The air-guiding element 16 is designed to generate a turbulent flow 30 downstream of the air-guiding element 16 when a flow is incident thereon, that is to say when an air flow 19 impinges on the air-guiding element 16. For this purpose, the air-guiding element 16 comprises a body including an incident-flow region 28 which is designed for an air flow 19 to be incident thereon, that is to say for receiving the air flow 19. The air flow 19 may in this case be in particular a laminar flow, or a turbulent flow. Furthermore, the air-guiding element 16 comprises a body further including a flow-off region 29, which is designed to generate a turbulent flow 30, that is to say to release the turbulent flow, downstream of the flow-off region 29. The flow-off region 29 is in particular of concave form. This embodiment is shown in FIG. 4.

In order that said turbulent flow 30 impinges on a surface, facing toward the interior compartment 13 of the motor vehicle 10, of the rear window 11, the air-guiding element 16 must be arranged upstream of at least one region of the rear window 11. A selection of possible positions at which the at least one air-guiding element 16 is arranged are illustrated by way of example in FIGS. 2 to 7.

The air-guiding element 16 may be arranged in the motor vehicle 10 on that surface of the rear window 11 which faces toward the interior compartment 13. See FIG. 5. In particular, the air-guiding element 16 is, for this purpose, equipped with a contact surface 35 which is designed to be joined together, in particular by means of adhesive bonding, with the surface of the rear window 11. In particular, the air-guiding element 16 is of at least partially transparent, in particular translucent, form. Here, the air-guiding element 16 is attached to the rear window 11 in particular in a front region. The front region of the rear window 11 is defined here as being closer than a rear region of the rear window 11 to the front 24 of the motor vehicle 10.

Figure 3:
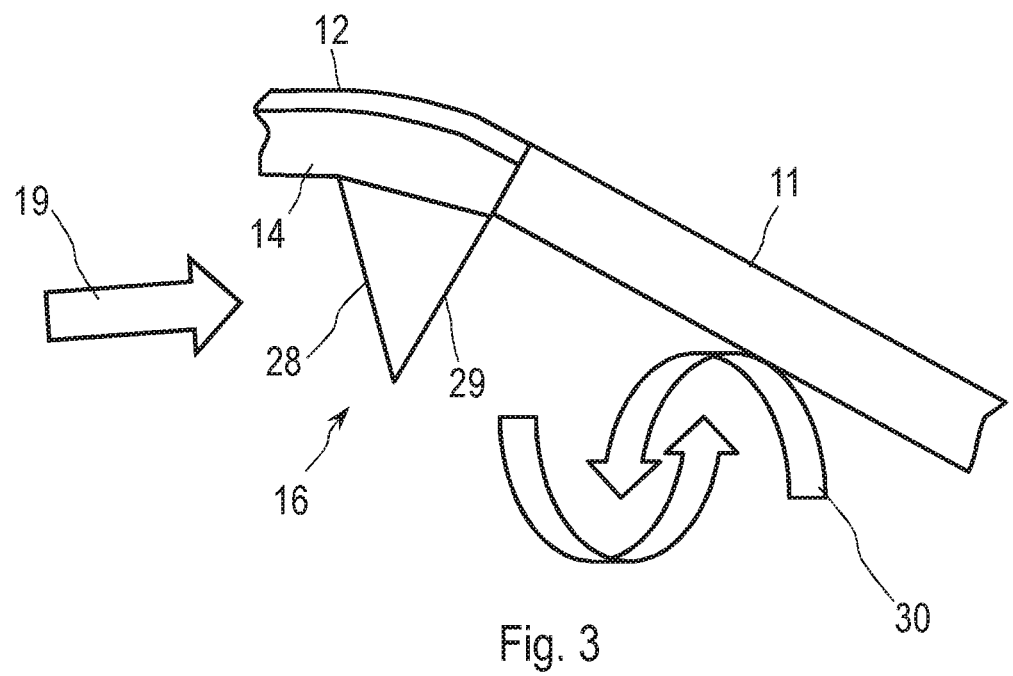
FIG. 3 shows an air-guiding element in a first exemplary embodiment.
Figure 4:
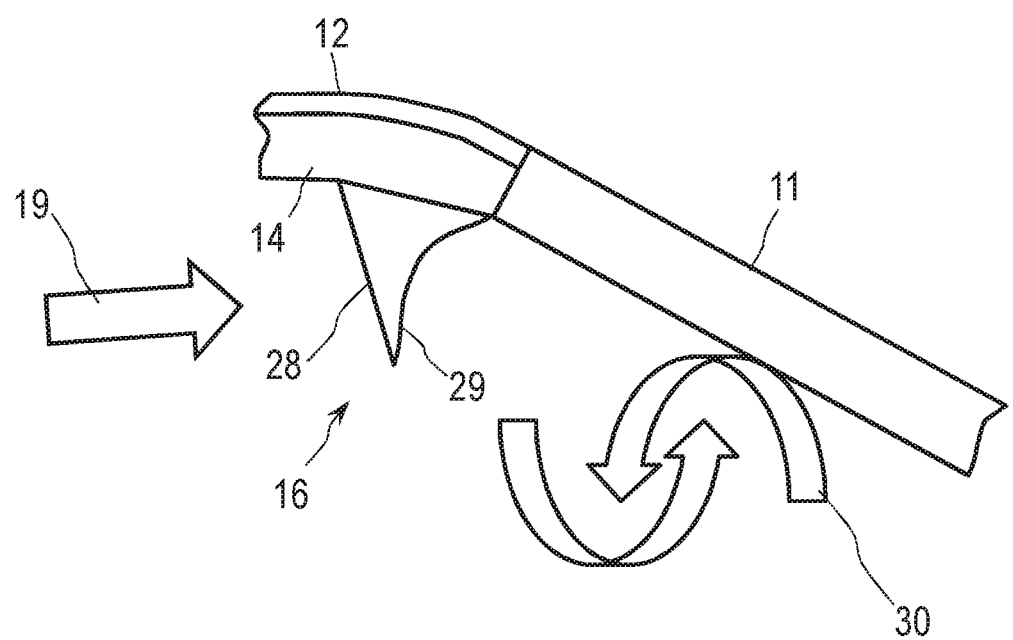
FIG. 4 shows the air-guiding element in a further exemplary embodiment.

FIGS. 3 and 4 show an arrangement of the air-guiding element 16 in the motor vehicle adjacent to the rear window 11, in particular in such a manner that the air-guiding element 16 does not make contact with the rear window 11. Here, the at least one air-guiding element 16 is preferably arranged on a paneling part, or integrated into a paneling part. Here, the air-guiding element 16 is in particular, in the direction of the rear 25 of the motor vehicle 10, arranged in front of the rear window 11.

Here, the paneling part is in particular a roof lining 14. This situation is illustrated in FIGS. 3 and 4. Alternatively, the paneling part may be a lamp device, in particular a brake lamp device.

Figure 5:
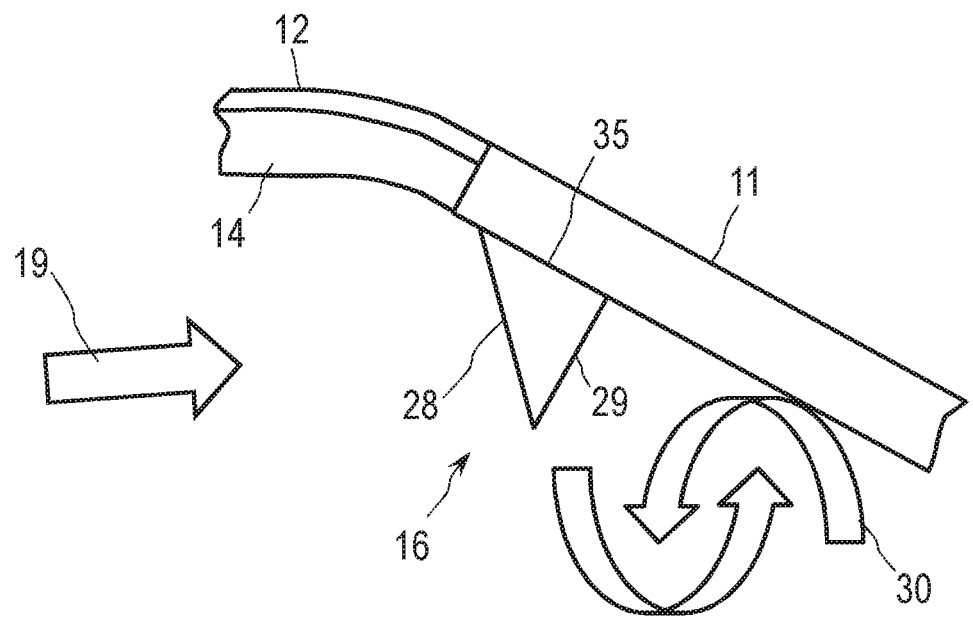
FIG. 5 shows the air-guiding element in an exemplary arrangement.

As an alternative to the arrangement in the paneling part, the air-guiding element 16 may be arranged on the rear window 11. This situation is shown in FIG. 5. Here, the contact surface 35 is in particular adhesively bonded to the rear window 11. In particular, the contact surface 35 has an adhesive layer for this purpose.

Figure 6:
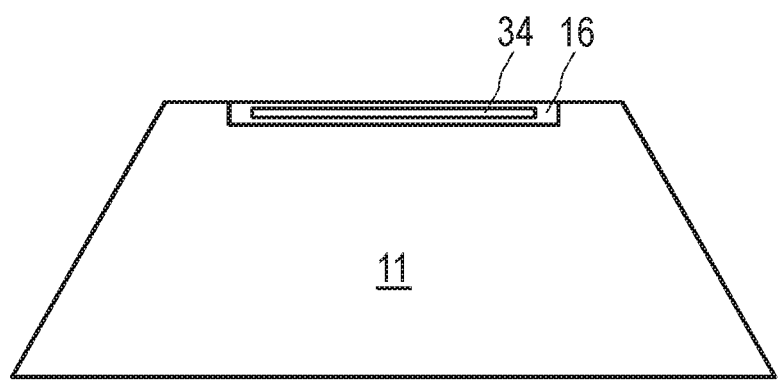
FIG. 6 shows the air-guiding element in a further exemplary arrangement.

As an alternative to the arrangement in the brake lamp device, provision is made for the air-guiding element 16 to comprise, in particular, at least one lamp 34. Said lamp 34 may be designed in particular as a brake lamp and/or as an ambient lamp and/or as a reading lamp. FIG. 6 illustrates the air-guiding element 16 with the lamp 34 formed as a brake lamp.

FIG. 7 illustrates the rear window 11 with multiple air-guiding element 16, wherein an air-guiding element 16 arranged at the upper edge of the rear window 11 is equipped with the lamp 34.

The motor vehicle 10 comprises, in particular, at least one air vent 15. The air vent 15 is designed to generate an air flow 19. Here, the at least one air vent 15 is arranged in the motor vehicle 10 such that the air flow 19 reaches the at least one air-guiding element 16. In the exemplary embodiment shown in FIG. 2, the motor vehicle 10 has multiple air vents 15. Accordingly, the air vent 15 may be arranged in a dashboard 32 and/or in a door paneling part 31 and/or in the side paneling part 23 and/or in a console 33.

Although the air-guiding element and motor vehicle have been illustrated and described in more detail on the basis of the preferred exemplary embodiments, the air-guiding element and motor vehicle are not restricted by the disclosed examples, and other variations may be derived therefrom by a person skilled in the art without departing from the scope of protection set forth in the following claims.

The figures are not necessarily accurate in all details and true to scale, and may be presented on an enlarged scale or a reduced scale in order to provide a better overview. Therefore, functional details disclosed here are to be understood not as being of a limiting nature but rather merely as an illustrative basis that provides a person skilled in the art in this technological field with guidance for using the air-guiding element and the motor vehicle in a versatile manner.

The expression "and/or" used here, where used in a series of two or more elements, means that each of the stated elements may be used individually, or any combination of two or more of the stated elements may be used. For example, if a configuration is described which comprises the components A, B and/or C, the configuration may comprise A on its own; B on its own; C on its own; A and B in combination; A and C in combination; B and C in combination; or A, B and C in combination.

What is claimed:

1. An air-guiding element for arrangement in an interior compartment of a motor vehicle including a rear window and at least one air vent arranged in the interior compartment to generate an air flow in the interior compartment, the air-guiding element comprising:
a body located in the interior compartment of the vehicle and including an incident-flow region receiving the air flow from the at least one air vent and a concave flow-off region releasing a turbulent flow downstream of said air-guiding element across said rear window, wherein the incident-flow region has a straight surface that joins the concave flow-off region at a peak, wherein the air flow is in a direction of the at least one air-guiding element, and wherein the air-guiding element is proximate to or connected to the rear window.

2. The air-guiding element as claimed in claim 1, wherein said air-guiding element is at least partially transparent.

3. The air-guiding element as claimed in claim 2, wherein said air-guiding element has a contact surface for attachment to the rear window.

4. The air-guiding element as claimed in claim 3, wherein said air-guiding element has a lamp.

5. The air-guiding element as claimed in claim 4, wherein said lamp is formed as a brake lamp.

6. The air-guiding element of claim 1, wherein said air-guiding element has a contact surface designed for attachment to the rear window.

7. The air-guiding element of claim 1, wherein said air-guiding element has a lamp.

8. The air-guiding element of claim 7, wherein said lamp is formed as a brake lamp.

9. The air-guiding element as claimed in claim 1, arranged adjacent an upper region of said rear window.

10. The air-guiding element as claimed in claim 1, arranged adjacent and along a lateral region of said rear window.

11. A motor vehicle having an interior compartment which is at least partially enclosed by a rear window and at least one vent arranged in the interior compartment, comprising at least one air-guiding element, wherein said at least one air-guiding element includes a body having an incident-flow region receiving an air flow from the at least one vent and a flow-off region releasing a turbulent flow downstream of said air-guiding element across said rear window, wherein the incident-flow region has a straight surface and the flow-off region has a concave surface that joins the straight surface at a peak, and wherein said at least one air-guiding element is arranged proximate to or connected to the rear window and adjacent an upper region of said rear window, and wherein said motor vehicle has the at least one air vent arranged in the interior compartment to generate said air flow in the interior compartment in a direction of the at least one air-guiding element.

12. The motor vehicle as claimed in claim 11, wherein said at least one air-guiding element is arranged on a surface of the rear window facing toward the interior compartment.

13. The motor vehicle as claimed in claim 11, wherein said at least one air-guiding element is free of the rear window.

14. The motor vehicle as claimed in claim 11, wherein said rear window includes a heating wire.

15. The motor vehicle as claimed in claim 11, wherein said motor vehicle is a sedan.

16. A motor vehicle having an interior compartment which is at least partially enclosed by a rear window and at least one air vent arranged in the interior compartment, comprising at least one air-guiding element, wherein said at least one air-guiding element includes a body having an incident-flow region receiving an air flow from the at least one air vent and a flow-off region releasing a turbulent flow downstream of said air-guiding element across said rear window, wherein the incident-flow region has a straight surface and the flow-off region has a concave surface that joins the straight surface at a peak, and wherein said at least one air-guiding element is proximate to or connected to the rear window and is arranged adjacent and along a lateral region of said rear window, and wherein said motor vehicle has the at least one air vent arranged in the interior compartment to generate said air flow in the interior compartment in a direction of the at least one air-guiding element.

17. The motor vehicle as claimed in claim 16, wherein said at least one air-guiding element is arranged on a surface of the rear window facing toward the interior compartment.

18. The motor vehicle as claimed in claim 16, wherein said at least one air-guiding element is free of the rear window.

* * * * *